US008380578B2

(12) United States Patent
Ko

(10) Patent No.: US 8,380,578 B2
(45) Date of Patent: Feb. 19, 2013

(54) METHOD AND SYSTEM FOR JOINT-USE OF ELECTRONIC PRODUCT USING MOBILE COMMUNICATION NETWORK

(75) Inventor: Jong Ok Ko, Seoul (KR)

(73) Assignee: Fobikr Co., Ltd., Incheon (KR)

( * ) Notice: Subject to any disclaimer, the term of this patent is extended or adjusted under 35 U.S.C. 154(b) by 273 days.

(21) Appl. No.: 12/995,775

(22) PCT Filed: Jun. 1, 2009

(86) PCT No.: PCT/KR2009/002902
§ 371 (c)(1),
(2), (4) Date: Dec. 2, 2010

(87) PCT Pub. No.: WO2009/148241
PCT Pub. Date: Dec. 10, 2009

(65) Prior Publication Data
US 2011/0082766 A1   Apr. 7, 2011

(30) Foreign Application Priority Data

Jun. 2, 2008   (KR) .................. 10-2008-0051505

(51) Int. Cl.
*G06Q 30/00* (2012.01)
(52) U.S. Cl. .................................................. 705/26.1
(58) Field of Classification Search ............. 705/26.1, 705/27.1
See application file for complete search history.

(56) References Cited

U.S. PATENT DOCUMENTS

| 6,439,345 | B1 * | 8/2002 | Recktenwald et al. | 186/55 |
| 6,985,879 | B2 * | 1/2006 | Walker et al. | 705/35 |
| 7,496,527 | B2 * | 2/2009 | Silverstein et al. | 705/26.8 |
| 2004/0093281 | A1 * | 5/2004 | Silverstein et al. | 705/26 |
| 2005/0097034 | A1 * | 5/2005 | Loeger et al. | 705/39 |
| 2007/0106556 | A1 * | 5/2007 | Edwards et al. | 705/14 |
| 2010/0274567 | A1 * | 10/2010 | Carlson et al. | 705/1.1 |

FOREIGN PATENT DOCUMENTS

| KR | 10-2004-0038456 | 5/2004 |
| KR | 10-2005-0060493 | 6/2005 |
| KR | 10-2006-0082230 | 7/2006 |

OTHER PUBLICATIONS

Age-old practices in the 'new world': a study of gift-giving between teenage mobile phone users CHI '02 Proceedings of the SIGCHI Conference on Human Factors in Computing Systems pp. 439-446, ACM New York, NY, USA 2002.*
International Search Report in PCT/KR2009/002902 dated Jan. 8, 2010.

* cited by examiner

*Primary Examiner* — Matthew Zimmerman
(74) *Attorney, Agent, or Firm* — Harness, Dickey & Pierce, P.L.C.; Anthony G. Fussner; Kisuk Lee

(57) ABSTRACT

There is provided a method comprising: receiving a request for information on electronic products from a first mobile communication terminal over a mobile communication network and providing information on a list of electronic products; receiving a request for payment for an electronic product selected from the provided information on the list, and transmitting a payment result after carrying out payment procedures for the selected electronic product; storing the paid electronic product in a joint account; receiving a request for access to the joint account from a second mobile communication terminal and determining whether or not to allow the access to the joint account; and receiving a request for checking availability of some of the electronic products stored in the joint account from the second mobile communication terminal and checking the availability of the requested electronic products.

15 Claims, 3 Drawing Sheets

METHOD AND SYSTEM FOR JOINT-USE OF ELECTRONIC PRODUCT USING MOBILE COMMUNICATION NETWORK

CROSS-REFERENCE TO RELATED APPLICATIONS

This application is a national phase application of PCT Application No. PCT/KR2009/002902 filed on Jun. 1, 2009, which claims the benefit and priority to Korean Patent Application No. 10-2008-0051505 filed Jun. 2, 2008. The entire disclosures of the applications identified in this paragraph are incorporated herein by references.

FIELD

The following description relates to a method and a system for the joint-use of an electronic product, and more particularly, to a method and a system for the joint-use of an electronic product using a mobile communication network.

BACKGROUND

An electronic service has been recently used, which allow a consumer to make the payment for goods online or through a messenger program, and then transmit information on the paid goods to a mobile apparatus of another user, who is enabled to use the goods in a real-life store based on the received information on the paid goods. However, the above electronic service causes inconvenience to users since the users have to directly communicate with each other.

In addition, if a message containing information on the paid goods is inadvertently deleted, a user has to request a sender to resend the message so as to use the corresponding goods. Moreover, due to the nature of the mobile communication network, if a recipient mobile terminal is not available to receive a message, a series of information on consecutively paid goods need to be present, and if the recipient mobile terminal cannot receive the message for long time, it is difficult to use the service. In a general electronic service using a short message service, a message that fails to be delivered within 12 hours after transmission is discarded.

Furthermore, once the message has sent, it is nearly impossible to cancel the transmission, and it is not possible to set up conditions for a receiver to use of the paid goods. Moreover, after the recipient has received the message, it is not easy to forward the message to others for the purchase purpose of the corresponding goods. As such, the general electronic service has various drawbacks.

DETAILED DESCRIPTION

Objects

The following description relates to a method of the joint-use of an electronic product using a mobile communication network.

In addition, the following description relates to a system for the joint-use of an electronic product using a mobile communication network.

Technical Solutions

In one general aspect, there is provided a method of joint-use of an electronic product using a mobile communication network, the method including: receiving a request for information on electronic products from a first mobile communication terminal over a mobile communication network and providing information on a list of electronic products; receiving a request for payment for an electronic product selected from the provided information on the list, and transmitting a payment result after carrying out payment procedures for the selected electronic product; storing the paid electronic product in a joint account; receiving a request for access to the joint account from a second mobile communication terminal and determining whether or not to allow the access to the joint account; and receiving a request for checking availability of some of the electronic products stored in the joint account from the second mobile communication terminal and checking the availability of the requested electronic products.

The method may further include, prior to receiving the request for information on electronic products, grouping a plurality of mobile communication terminals in a same user group, wherein the determining whether or not to allow the second mobile communication terminal to access the joint account comprises allowing the access to the joint account when the second mobile communication terminal belongs to the same user group as the first mobile communication terminal.

The method may further include, when the second mobile communication terminal belongs to the same user group as the first mobile communication terminal, accessing the joint account and checking the paid electronic products using the second mobile communication terminal.

The method may further include, when the electronic product of which availability has been checked is used, making the used electronic device distinguishable in the joint account and transmitting information on the used electronic product to mobile communication terminals belonging to the user group.

The method may further include assigning authorization for use of the electronic products in the joint account to the respective mobile communication terminals belonging to the same user group.

The assigning of the authorization may include assigning the authorization according to time or the number of the electronic products. The method may further include, in response to selecting some of the electronic products of which availability has been checked for use, transmitting to the second mobile communication terminal information on stores in the vicinity in which the selected electronic products are available to be obtained, based on location information of the second mobile communication terminal.

The method may further include receiving a message upon the request for payment, or receiving a message when some of the electronic products of which availability has been checked are used. The method may further include downloading information on the electronic products of which availability has been checked to the second mobile communication terminal.

The information on the electronic products of which availability has been checked may be an icon, a barcode, or data which represents a name, a quantity, a price, and a term of validity of the electronic product.

In another general aspect, there is provided a system for joint-use of an electronic product using a mobile communication network, the system including: a message transceiver unit configured to transmit and receive a message to/from mobile communication terminals over the mobile communication network; a joint-account database configured to store a plurality of joint accounts; a product information database configured to store pieces of information on a list of a plurality of electronic products; a payment unit configured to carry out payment procedures for the electronic product and transmit a payment result; and a control unit configured to provide the information on the list of the electronic products in response to a request for information on the electronic products, store the electronic product paid by the payment unit in the joint account database, and check availability of an electronic product in the joint account in response to a request for checking the availability of the electronic product.

The system may further include a grouping unit configured to group a plurality of mobile communication terminals in a same user group and allow the mobile communication terminals belonging to the same user group to access the same joint account.

The control unit may be further configured to, when the electronic product of which availability has checked is used, make the used electronic product distinguishable in the corresponding joint account, and control the message transceiver unit to transmit information on the used electronic product to the mobile communication terminals belonging to the same user group. The control unit may be further configured to assign authorization for use of the electronic products in the joint account to the respective mobile communication terminals belonging to the same user group.

The control unit may be further configured to, when some of the electronic products of which availability has been checked are selected for use, transmit to the second mobile communication terminal information on stores in the vicinity in which the selected electronic products are available to be obtained, based on location information of the second mobile communication terminal.

In another general aspect, there is provided a method of joint-use of an electronic product using a mobile communication network, the method including: receiving a request for information on electronic products from a computer over an Internet network and providing information on a list of electronic products; receiving a request for payment for an electronic product selected from the provided information on the list, and transmitting a payment result after carrying out payment procedures for the selected electronic product; storing the paid electronic product in a joint account; receiving a request for access to the joint account from a mobile communication terminal and determining whether or not to allow the access to the joint account; and receiving a request for checking availability of some of the electronic products stored in the joint account from the second mobile communication terminal and checking the availability of the requested electronic products. The computer may provide a web-browser or a messenger service to a user.

Advantages

A method for the joint-use of an electronic product using a mobile communication network as described in this disclosure enables communication with a system for the joint-use of an electronic product without direct communication among users, so that other users can purchase an electronic product corresponding to a specified product and other users jointly use an electronic product on a joint account. The method of the present disclosure is more efficient than known systems involving directly sending of a product.

BRIEF DESCRIPTION OF DRAWINGS

Other features and aspects may be apparent from the following detailed description, the drawings, and the claims.

DETAILED DESCRIPTION

Figure 1:
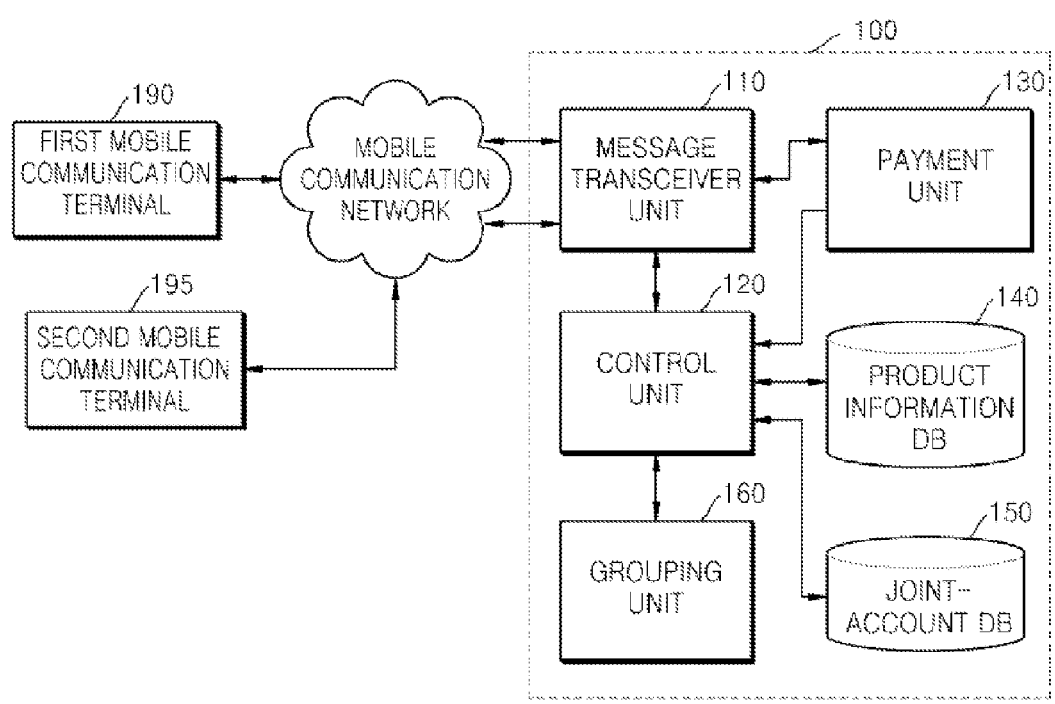
FIG. 1 is a diagram illustrating an example of a system for the joint-use of an electronic product using a mobile communication network.

Throughout the drawings and the detailed description, unless otherwise described, the same drawing reference numerals will be understood to refer to the same elements, features, and structures. The relative size and depiction of these elements may be exaggerated for clarity, illustration, and convenience.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a system for the joint-use of an electronic product using a mobile communication network.

Referring to FIG. 1, the system 100 may include a message transceiver unit 110, a joint-account database 150, a product information database 140, a payment unit 130, and a control unit 120. For convenience of explanation, in the example illustrated in FIG. 1, a first mobile communication terminal 190 and a second mobile communication terminal 195 are also illustrated.

The message transceiver unit 110 may transmit and receive messages to/from mobile communication terminals. The joint-account database 150 may store a plurality of joint accounts, and the product information database 140 may store information on a list of electronic products (hereinafter, will be referred to as "electronic product list information"). The payment unit 130 may carry out payment procedures for an electronic product, and transmit the payment result.

The control unit 120 may store the electronic product list information of the product information database 140 in response to a request for information on electronic products. The control unit 120 may store information on electronic products for which the payment has been made by the payment unit 130 in the joint-account database 150, and check the availability of the electronic products in response to a request for checking the availability of the electronic products stored in the joint-account database 150.

The system 100 may group a plurality of mobile communication terminals together into a user group, and further include a grouping unit 160 to allow the mobile communication terminals belonging to the same user group to access the same joint account.

The first mobile communication terminal 190 may access the system 100 over a mobile communication network. The first mobile communication terminal 190 may select a desired electronic product from the electronic product list information of the product information database 140, and make the payment for the desired electronic product through the payment unit 130. The paid electronic product may be stored in a joint account of the joint-account database 150. In this case, a plurality of joint accounts may be present, and the respective joint accounts may correspond to user groups.

The electronic product may be an icon, image information, or data information which represents a general product purchasable online or in real-life stores, and may be displayed through the first communication mobile terminal 190 and the second mobile communication terminal 195 which access the system 100 through the mobile communication network.

The second mobile communication terminal 195 may access the system 100 through the mobile communication network. The second mobile communication terminal 195 may select some electronic products from among the paid electronic products stored in the joint-account database 150, and use the selected electronic products at an online or a real-life store. Using the electronic product means obtaining an actual product corresponding to the electronic product selected from the joint account at a real-life store. In addition, since the electronic product selected from the joint account has been already paid, the actual product can be obtained without paying at the store.

As described above, a first user who uses the first mobile communication terminal 190 may pay for a specific electronic product through the first mobile communication terminal 190 and store the paid electronic product in the joint account, and a second user who uses the second mobile communication terminal 195 may be allowed to use the electronic product stored in the joint account at the store using the second mobile communication terminal 195. Hence, the first user may be enabled to present a particular product to the second user without directly communicating with the second user, but only by communicating with the system 100 that manages the joint account. In addition, the second user may receive the product presented by the first user without directly communicating with the first user, but through the communication with the system 100.

In response to using electronic product which has been checked as being available for use, the control unit 120 may make the used electronic product distinguishable in a corresponding joint account, transmit information on the used electronic product to mobile communication terminals belonging to the same user group through the message transceiver unit 110, and assign authorization for use of the electronic product in the joint account to the respective mobile communication terminals belonging to the same user group. In addition, in response to selecting some of the electronic products which have been checked as being available for use, the control unit 120 may obtain information on stores in the vicinity of the second mobile communication terminal 195, where the second user can use the available electronic products, based on the location information of the second mobile communication terminal 195, and transmit the obtained information on stores to the second user. The above-described operation of the control unit 120 will be described in detail in conjunction with a method of the joint-use of an electronic product shown in an example illustrated in FIG. 2.

Figure 2:
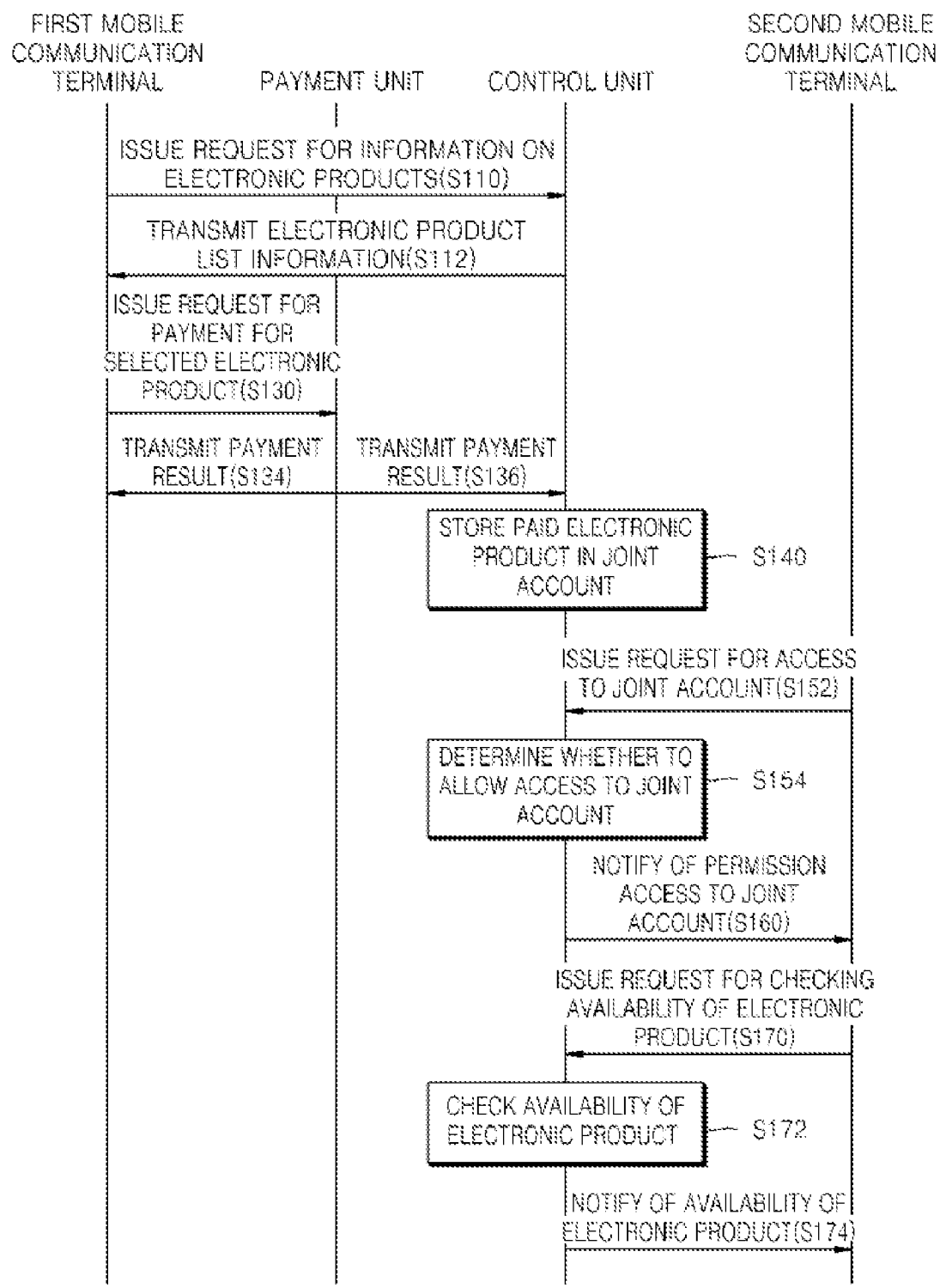
FIG. 2 is a diagram illustrating an example of a method of the joint-use of an electronic product.

FIG. 2 illustrates an example of a method of the joint-use of an electronic product.

Referring to the example illustrated in FIG. 2, the control unit receives a request for information on electronic products from the first mobile communication unit S110, and stores information on a list of the electronic products (hereinafter, will be referred to as "electronic product list information) S112. A request for payment for an electronic product selected from the received electronic product list information is received S130, and payment procedures are carried out for the selected electronic product and the payment result is transmitted S134 and S136. The payment unit makes the payment, and transmits the payment result to the first mobile communication terminal and the control unit.

The control unit stores the paid electronic product in a joint account S140.

A request for access to the joint account is received from the second mobile communication terminal S152, and it is determined whether or not the access to the joint account is allowed S154. If the second mobile communication terminal satisfies requirements for access, a notification of permission of access to the joint account is issued S160.

Thereafter, the control unit receives a request for checking the availability of some of the electronic products stored in the joint account from the second mobile communication terminal S170, checks the availability of the requested electronic product S172, and notifies the second mobile communication terminal of the availability of the electronic product S174.

A plurality of mobile communication terminals may be grouped as one user group. For example, if the second mobile communication terminal is belonging to the user group including the first mobile communication terminal, the second mobile communication terminal is allowed to select and use the electronic product that has been stored in the joint account by the first mobile communication terminal.

The grouping unit 160 in the example illustrated in FIG. 1 creates the user group, and the user group may be created before the request for information on the electronic products is received S110. However, the creation of the user group may be performed not only before operation S110, but also upon making the payment for the electronic product, and a user may be added to a particular user group under given conditions.

If the user group of the first mobile communication terminal that has received the request for access to the joint account from the second mobile communication terminal and has stored the electronic product in the joint account is the identical with the user group of the second mobile communication terminal, the second mobile communication terminal is allowed to access the joint account.

If the second mobile communication terminal is belonging to the user group including the first mobile communication terminal, the second mobile communication terminal further accesses the joint account to check the paid electronic product after the first mobile communication terminal stores the paid electronic product in the joint account. That is, the second mobile communication terminal periodically accesses the joint account which is associated with the second mobile communication terminal and checks whether a new electronic product is stored. An interval for checking may vary according to settings.

Authorization for use of the electronic products in the joint account may be differently assigned to the respective mobile communication terminals belonging to the same user group. The authorization for use of the electronic products may be assigned to particular mobile communication terminals only for a defined period of time, or the electronic products available to specific mobile communication terminals may be limited in types and numbers.

For example, a father may make the payment for three cups of Starbucks coffee, setting a condition that each family member only can use a cup of coffee. In other words, it is not allowed for one family member to use all three cups of coffee. In addition, a condition may be set which prohibits a certain family member from using a particular product.

To determine whether or not a mobile communication terminal is belonging to a particular user group and has authorization for access to a joint account, mobile phone number, a terminal serial number, a password, biometric information, and personal information may be used. Moreover, the above information may be used to determine whether or not a particular mobile communication terminal is authorized to use a specific product.

According to the above method of the joint-use of the electronic product using a mobile communication network, the used electronic product may be made distinguishable in the joint account by inactivating the electronic product once the electronic product of which availability has been checked is used, and information on the used electronic product may be transmitted to the mobile communication terminals belonging to the same user group.

When some of the electronic products of which availability has been checked are selected for use by the second mobile communication terminal, the control unit may obtain information on stores in the vicinity of the second mobile communication terminal, where the selected electronic products are available to be obtained, based on the location information of the second mobile communication terminal, and transmit the obtained information to the second mobile communication terminal. Accordingly, the second mobile communication terminal can easily find the stores where the electronic products stored in the joint account are available to be obtained. The location information of the second mobile communication terminal may be obtained through a global positioning system (GPS), a location based service (LBS), a radio frequency identification (RFID) system, and the like.

The method of the joint-use of the electronic product using the mobile communication network may allow a mobile communication terminal to receive and view the message at the time when another mobile communication terminal receives a request for payment. In addition, the mobile communication terminal may be allowed to receive and view a message at the time when some of the electronic products of which availability has been checked are used.

In other words, a person who makes the payment for the electronic product may leave a message, which is formed in a similar way as a reply comment on the Internet which should be accessed to view. For example, when making the payment for hamburgers as electronic products, a father may leave a message hoping that family members enjoy the hamburgers and an accessed family member can view the message. In addition, a daughter as a family member may leave a message to thank her father when taking the hamburger at a store which is found from information on available stores in the vicinity.

Moreover, each of the mobile communication terminals may periodically check the arrival of messages.

The control unit may control the information on the electronic products of which availability has been checked to be downloaded from the joint account to the second mobile communication terminal. That is, instead purchasing the electronic product by accessing the joint account and showing the paid electronic product through the second mobile communication terminal as described above, the information on the electronic product may be downloaded to the second mobile communication terminal from the joint account, and be obtained from a real-life store without additionally accessing the mobile communication network. Here, the information on the electronic product of which availability has been checked may be an icon, a barcode or data that represents a name, a quantity, a price, and a term of validity of the electronic product.

Although the above example of the method of the joint-use of the electronic product uses the mobile communication network, the Internet network may be used only for the first mobile communication terminal to select an electronic product and make the payment. In this case, a computer may be used instead of the first mobile communication terminal.

Figure 3:
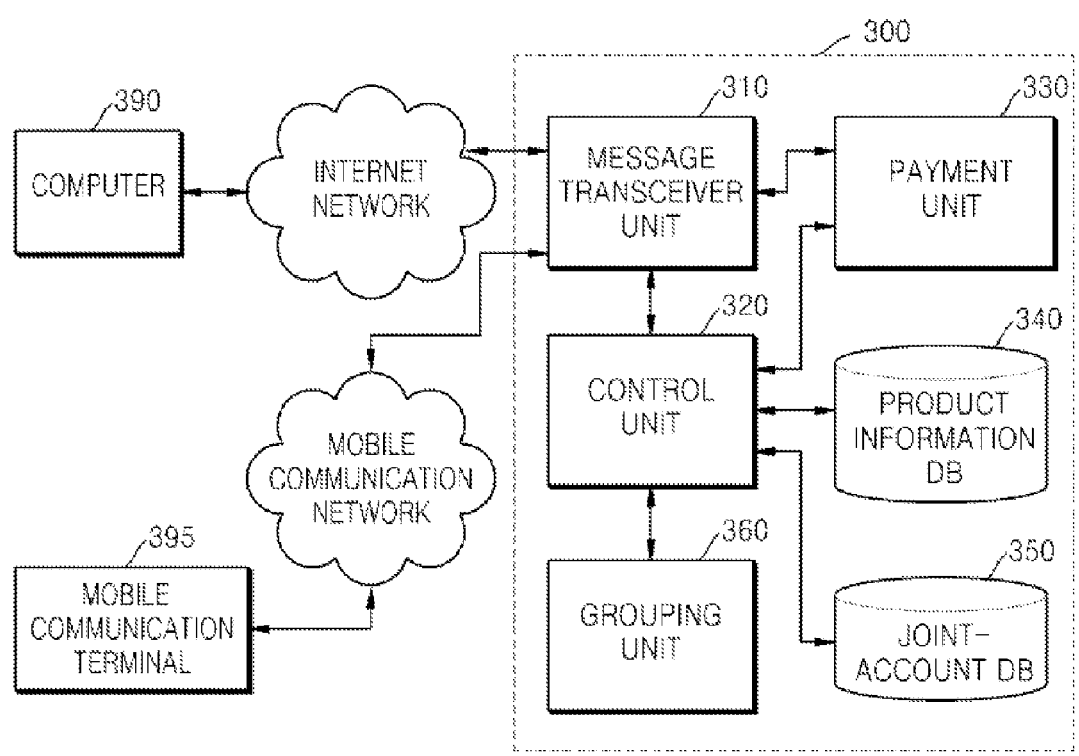
FIG. 3 is a diagram illustrating another example of a system corresponding to another method of the joint-use of an electronic product using a mobile communication network.

FIG. 3 illustrates another example of a system corresponding to another method of the joint-use of an electronic product using a mobile communication network.

Another method of the joint-use of an electronic product using a mobile communication network may include receiving a request for information on electronic products from a computer, providing information on a list of electronic products, receiving a request for payment for an electronic product selected from the list, transmitting a payment result after carrying out the payment procedures, storing the paid electronic product in a joint account, receiving a request for access to the joint account from a mobile communication terminal, determining whether or not to allow the access to the joint account, receiving a request for checking the availability of some of the electronic products stored in the joint account from the mobile communication terminal, and checking the availability of the electronic products.

In this example, the computer may provide a web-browser or a messenger service.

Referring to the example illustrated in FIG. 3, the system 300 is substantially similar to the system 100 shown in the example illustrated in FIG. 1 except that a computer 390 is used instead of the first mobile communication terminal 190 in FIG. 1 and the computer 390 accesses the system over the Internet network.

Operations and functionality of a mobile communication terminal 395 and a message transceiver unit 310, a payment unit 330, a product information database 340, a joint-account database 350, a control unit 320 and a grouping unit 360 of the system 300 are similar to those of the system 100 illustrated in FIG. 1, and thus detailed description will not be reiterated.

As described above, by the method of the joint-use of an electronic product using a mobile communication network, a user can purchase an electronic product associated with a particular product by only communicating with a system that manages a joint account without having to directly communicate with other users, so that the other users can use the purchased product. In addition, the other users can share the electronic products stored in the joint account. Therefore, the above method can realize a more effective system, compared to a general system which directly delivers a product to other users even when the recipients cannot make a response.

INDUSTRIAL APPLICABILITY

The present invention is applicable to an electronic commerce field which uses a mobile communication terminal.

What is claimed is:

1. A method of joint-use of an electronic product using a mobile communication network, the method comprising:

grouping a plurality of different mobile communication terminals in a same user group, wherein the plurality of different mobile communication terminals includes at least a first mobile communication terminal and a second mobile communication terminal;

subsequent to the grouping, receiving a request for information on a plurality of electronic products from the first mobile communication terminal over a mobile communication network and providing information on the plurality of electronic products, wherein each electronic product in the plurality of electronic products is at least one of an icon, image information, and data information associated with a purchasable product at one or more physical stores;

receiving a payment for a selected electronic product from the plurality of electronic products, and transmitting a payment result after carrying out payment procedures for the selected electronic product;

in response to at least the payment, storing the selected electronic product in a joint account;

receiving a request for access to the joint account from the second mobile communication terminal and determining whether or not to allow access to the joint account;

in response to at least the determination, checking availability of the selected electronic product using a computer processor and generating availability information on at least one physical store where the selected electronic product is available to be obtained as a result of the payment; and transmitting the availability information to the second mobile communication terminal.

2. The method of claim 1, further comprising:

wherein the determining whether or not to allow access the joint account comprises allowing access to the joint account when the second mobile communication terminal belongs to the same user group as the first mobile communication terminal.

3. The method of claim 2, further comprising:

accessing the joint account and checking the selected electronic product using the second mobile communication terminal, when the second mobile communication terminal belongs to the same user group as the first mobile communication terminal.

4. The method of claim 2, further comprising:

making the second electronic device distinguishable in the joint account and transmitting information on the selected electronic product to mobile communication terminals belonging to the same user group, when the selected electronic product of which availability has been checked is used.

5. The method of claim 2, further comprising:

assigning authorization for use of the selected electronic product in the joint account to the second mobile communication terminals.

6. The method of claim 5, wherein the assigning of the authorization comprises assigning the authorization according to a time or a total number of electronic products.

7. The method of claim 1, further comprising:

receiving a message upon the payment, or receiving a message when the selected electronic product of which availability has been checked is used.

8. The method of claim 1, further comprising:

downloading information on the selected electronic product of which availability has been checked to the second mobile communication terminal.

9. The method of claim 8, wherein the information on the selected electronic productof which availability has been checked is an icon, a barcode, or data which represents a name, a quantity, a price, and a term of validity of the selected electronic product.

10. A system of joint-use of an electronic product using a mobile communication network, the system comprising:

at least one computer processor;

at least one memory having executable instructions which configure the at least one computer processor to:

group a plurality of different mobile communication terminals in a same user group, wherein the plurality of different mobile communication terminals includes at least a first mobile communication terminal and a second mobile communication terminal;

subsequent to the grouping, receive a request for information on a plurality of electronic products from the first mobile communication terminal over a mobile communication network and providing information on the plurality of electronic products, wherein each electronic product in the plurality of electronic products is at least one of an icon, image information, and data information associated with a purchasable product at one or more physical stores;

receive a payment for a selected electronic product from the plurality of electronic products, and transmit a payment result after carrying out payment procedures for the selected electronic product;

in response to at least the payment, store the selected electronic product in a joint account;

receive a request for access to the joint account from the second mobile communication terminal and determine whether or not to allow access to the joint account;

in response to at least the determination, check availability of the selected electronic product using a computer processor and generate availability information on at least one physical store where the selected electronic product is available to be obtained as a result of the payment; and transmit the availability information to the second mobile communication terminal.

11. The system of claim 10, wherein the instructions further configure the at least one computer processor to: allow access to the joint account when the second mobile communication terminal belongs to the same user group as the first mobile communication terminal.

12. The system of claim 10, wherein the instructions further configure the at least one computer processor to: make the second electronic device distinguishable in the joint account and transmit information on the selected electronic product to mobile communication terminals belonging to the same user group, when the selected electronic product of which availability has been checked is used.

13. The system of claim 10, wherein the instructions further configure the at least one computer processor to: assign authorization for use of the selected electronic product in the joint account to the second mobile communication terminal.

14. The system of claim 10, wherein the instructions further configure the at least one computer processor to: receive a message upon the payment, or receiving a message when the selected electronic product of which availability has been checked is used.

15. The system of claim 10, wherein the instructions further configure the at least one computer processor to: download information on the selected electronic product of which availability has been checked to the second mobile communication terminal.

* * * * *